July 22, 1947.　　　　　D. B. MARTIN　　　　　2,424,360
AUTOMOTIVE POWER TAKE-OFF
Filed May 29, 1944　　　　3 Sheets-Sheet 1
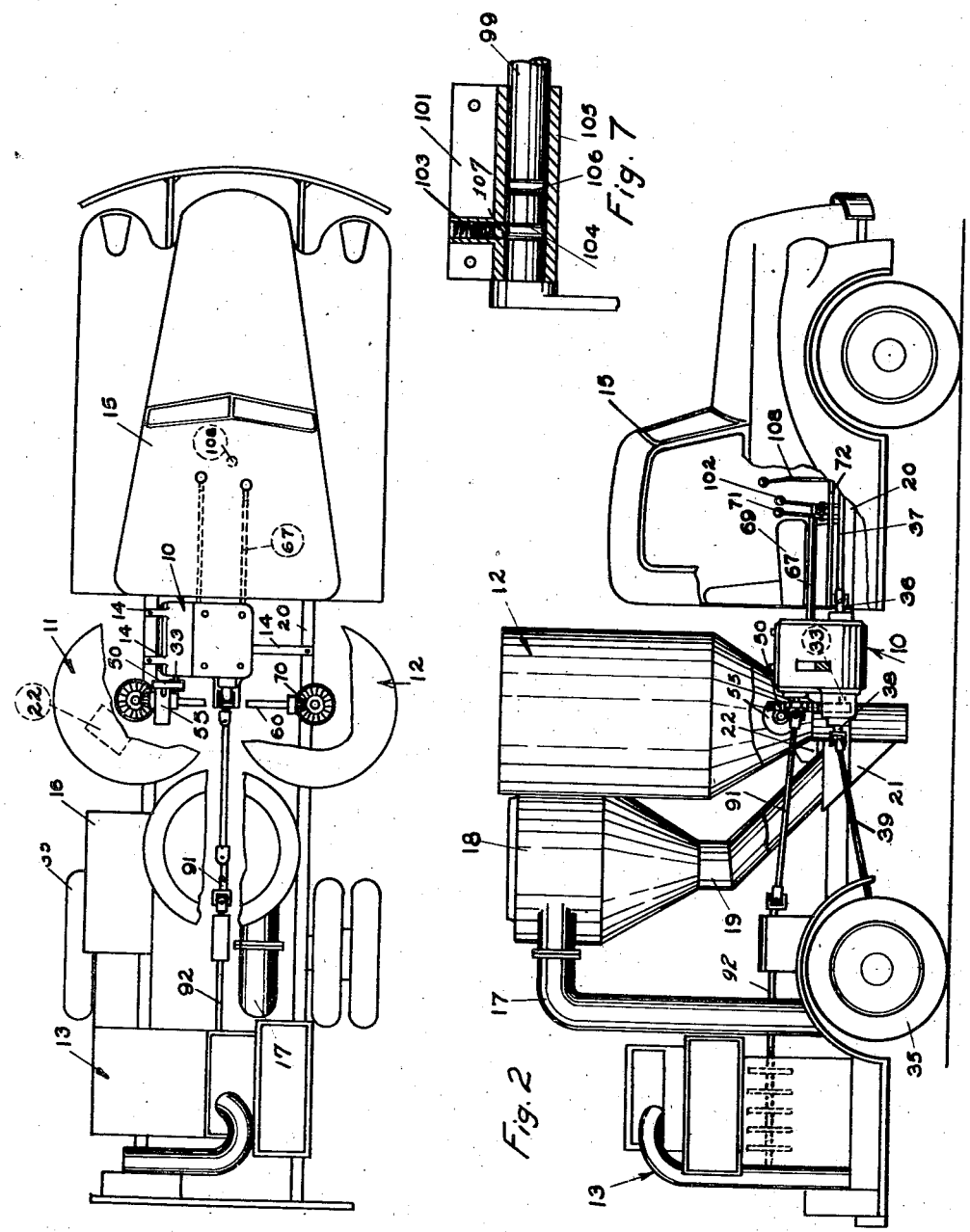
INVENTOR
Desiax B. Martin
by Rudolph L. Lowell
ATTORNEY

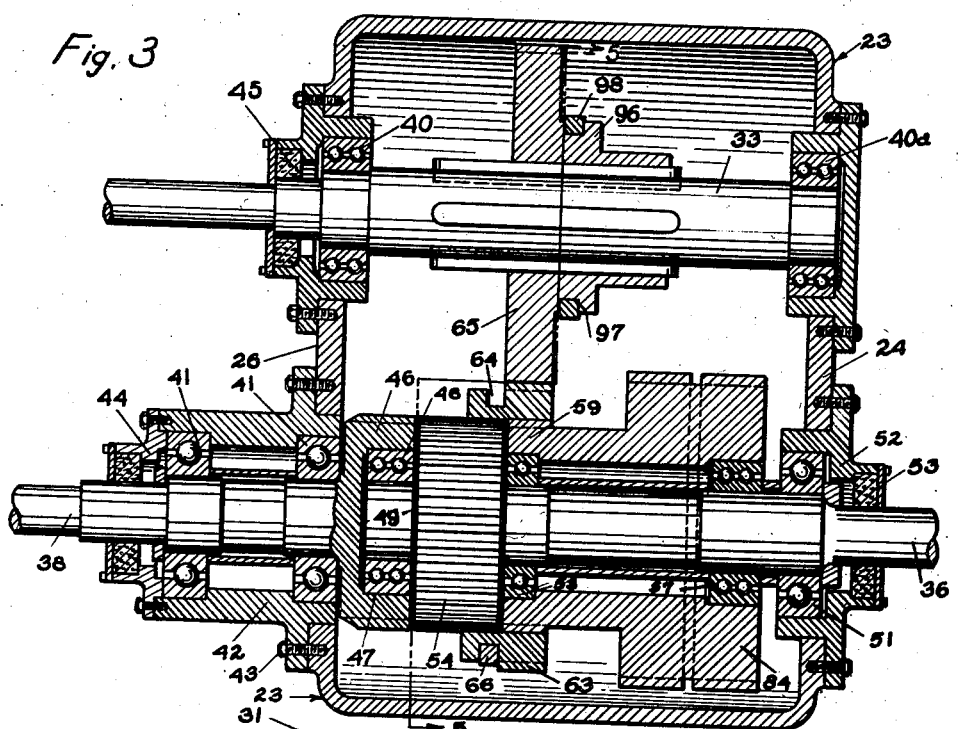
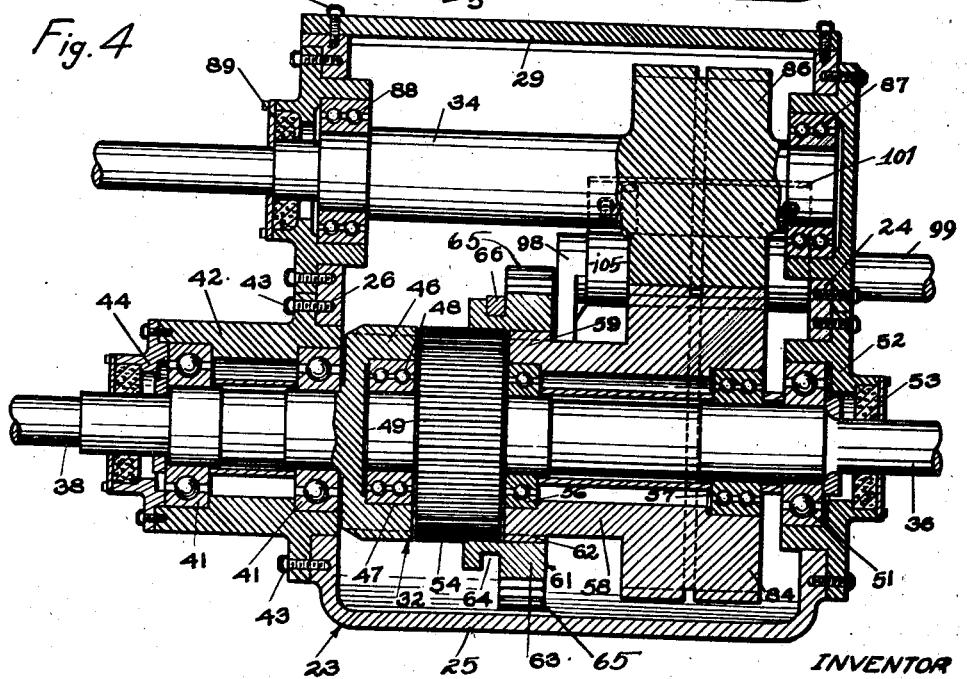

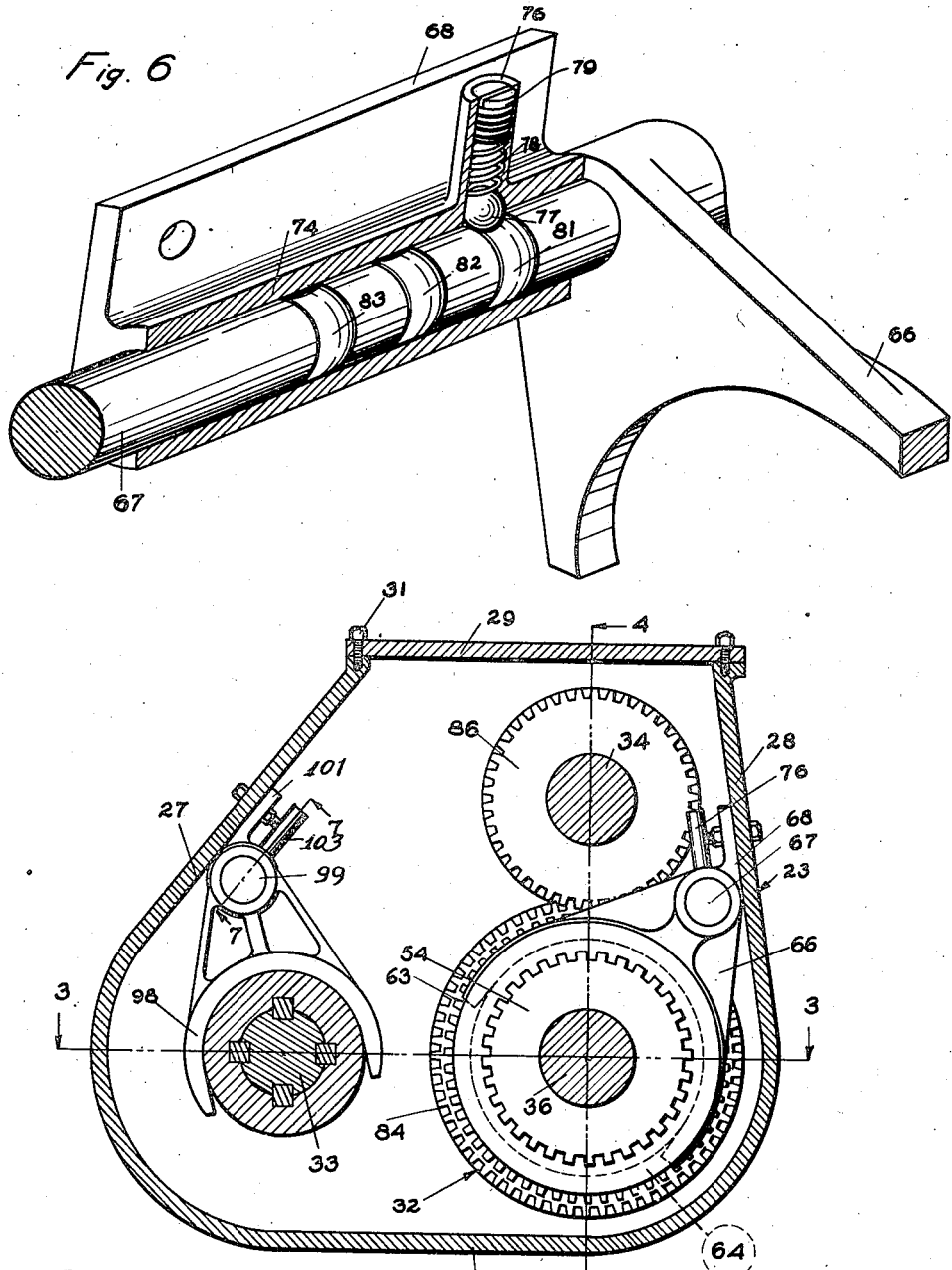

Patented July 22, 1947

2,424,360

UNITED STATES PATENT OFFICE 2,424,360

AUTOMOTIVE POWER TAKE-OFF

Desiax B. Martin, Des Moines, Iowa

Application May 29, 1944, Serial No. 537,845

4 Claims. (Cl. 74—11)

This invention relates generally to power transmission devices and in particular to a power transmission device adapted for use on a motor vehicle to selectively transmit power from the vehicle engine to the wheels of the vehicle and to operating units mounted on the vehicle.

An object of this invention is to provide a power transmission device adapted to transmit power from a common drive shaft to operate a plurality of operating units either separately or concurrently.

Yet another object of this invention is to provide a power transmission device on a motor vehicle which is capable of connecting the vehicle engine with the vehicle wheels, or of selectively connecting the vehicle engine with a plurality of operating units mounted on the vehicle.

A still further object of this invention is to provide a power transmission device for a motor vehicle which is interposed in the driving shaft from the vehicle engine to the vehicle wheels and operable to connect a plurality of operating units on the vehicle with the vehicle engine for concurrent or separate operation when the vehicle is at a standstill.

A feature of this invention is found in the provision of a power transmission device including a drive shaft with a fixed clutch member and a rotatable clutch member thereon and a driven shaft in coaxial alignment with the drive shaft having a clutch mounted thereon, with such three clutch members arranged end to end with the fixed clutch in an intermediate position. A shiftable clutch member is mounted for axial movement on the three clutch members to provide for the selective connection of the driven shaft and the rotatable clutch member in a driven relation with the fixed clutch member.

Further objects, features and advantages of this invention will become apparent from the following description when taken in connection with the accompanying drawings in which:

Fig. 1 is a diagrammatic plan view of a motor vehicle with parts broken away to show the assembly of a plurality of operating units on the motor vehicle with the power transmission device of this invention;

Fig. 2 is a diagrammatic side elevational view of the motor vehicle shown in Fig. 1 with parts broken away to more clearly show the assembly relation of the power transmission device therewith;

Fig. 3 is a longitudinal sectional view of the power transmission device as seen on the line 3—3 in Fig. 5;

Fig. 4 is a longitudinal sectional view of the power transmission device taken on the line 4—4 in Fig. 5;

Fig. 5 is a transverse sectional view as seen along the line 5—5 in Fig. 3;

Fig. 6 is a perspective view of a detail in one of the clutch mechanisms in the power transmission device; and Fig. 7 is a fragmentary sectional view taken on the line 7—7 in Fig. 5 showing a detail in another clutch mechanism in the power transmission device.

With reference to the drawings the power transmission device of this invention is designated generally as 10 in Figs. 1 and 2, and illustrated in assembly relation with a truck having a plurality of operating units 11, 12 and 13 mounted on it. The truck and operating units constitute a portable feed grinding and mixing mill, the operating units 11 and 12 designating batch feed mixers provided with centrally located upright augers (not shown) and the operating unit 13 designating a feed grinder, or grinding mill.

The feed to be ground is introduced into the grinding mill 13 through a swingable hopper 16 which is shown in a road position in Fig. 1. The ground feed is discharged from the grinding mill through an upright conduit 17 and into the upper end of a dust collector 18 in which the dust is separated from the feed. The separated feed is carried through an outlet 19 at the bottom of the dust collector 18 into the lower ends of the batch mixers 11 and 12. Other feed to be mixed with the feed leaving the dust collector 18 is introduced into the batch mixers 11 and 12 through inlet portions 21, with the mixing taking place in the usual manner by the operation of the augers within the mixers 11 and 12. The ground feed is then removed from the batch mixers through sacking outlets 22 for each of the mixers 11 and 12.

The power transmision device 10 of this invention is adapted to provide for a normal operation of the truck, and when the truck is at a standstill, for either a separate operation of the batch mixers 11 and 12, and grinding mill 13, or for a concurrent operation of the batch mixers and grinding mill. It is contemplated that the power transmission device 10 be provided with brackets 14 and supported on the truck chassis 20 intermediate the batch mixers 11 and 12 and adjacent the lower rear end of the truck cab 15, as illustrated in Figs. 1 and 2.

The power transmission device 10 includes a one piece casing or housing 23 having a bottom 25, straight end walls 24 and 26 and upwardly inclined side walls 27 and 28 (Figs. 3, 4 and 5). A top cover 29 is detachably connected with the casing 23 by cap screws 31 or the like. Rotatably supported longitudinally of the casing 23 and in a spaced parallel relation are a power shaft unit 32, and counter or driven shafts 33 and 34. The shaft unit 32 and the shaft 33 are located adjacent the casing bottom 25 with their axes in a common horizontal plane, and the shaft 34 is located above the shaft unit 32 with its axis in a vertical plane common with the axis of the shaft unit 32.

The shaft unit 32 is comprised of a driving shaft 36 operatively connected with a driving shaft 37 from the truck engine, and a driven shaft 38 suitably connected with the rear wheels 35 of the truck through means including a torque shaft 39 (Figs. 2, 3 and 4). The driven shaft 38 is rotatably supported in axially spaced bearings 41 mounted in a tubular extension 42 secured to the casing end wall 26 by screws 43. The outer end of the extension 42 carries an oil retaining ring assembly 44. Integrally formed with the driven shaft 38 at its end within the casing 23 is an externally splined clutch member 46 having a central opening or socket 47 for receiving a bearing 48 in which the inner end 49 of the drive shaft 36 is rotatably supported. The opposite end of the drive shaft 36 is rotatably supported in a bearing 51 carried within the inner end of a boss portion 52 secured to the casing end wall 24, with an oil retainer ring 53 being carried at the outer end of the boss portion 52.

Mounted adjacent the inner end 49 of the drive shaft 36 is an externally splined clutch member 54 having a diameter corresponding to the clutch member 46 on the driven shaft 38. Rotatably supported on the drive shaft 36, in axially spaced bearings 56 and 57 and between the clutch member 54 and the bearing 51, is a sleeve member 58 integrally formed at its end adjacent the clutch member 54 with an externally splined clutch member 59 having a diameter corresponding to the diameter of the clutch member 54.

It is thus seen that the clutch members 46, 54 and 59 are of like diameters and formed with like splined or toothed members, with all three of these clutch members being arranged adjacent to each other in coaxial alignment and with the clutch member 54 intermediate the clutch members 46 and 59. Further the gear 46 is rotatable with the driven shaft 38 and the clutch member 54 is rotatable with the drive shaft 36, while the clutch member 59 is freely rotatable on the drive shaft 36.

Slidably mounted for movement axially of the shaft unit 32 and on the clutch members 46, 54 and 59 is a shiftable clutch ring member 61 integrally formed with an internally splined or gear portion 62 adapted for mating engagement with such three clutch members, and an external gear portion 63 adapted for mating engagement with a gear member 65 carried on the counter shaft 33 for a purpose which will appear later. An annular peripheral groove 64 adjacent the gear portion 63 receives a yoke 66 which is mounted adjacent one end of a shift or clutch rod 67 slidably supported in a bracket 68 carried on the inside surface of the casing side wall 28 (Fig. 6). The outer end of the shift rod 67 extends outwardly from the casing 23 in a direction forwardly of the truck and terminates at a position adjacent the front of the operator's seat 69 within the truck cab 15 (Figs. 1 and 2). An upright lever 71 for shifting the rod 67 is located forwardly of the driver's seat 69 and is pivoted at its lower end to a frame portion 72 suitably carried on the truck chassis 20. The outer end of the shift rod 67 is pivoted to the shift lever 71 at a position above the pivotal connection of the lever 71 with the frame portion 72. Thus on pivotal movement of the lever 71 in a direction forwardly and rearwardly of the truck the shift rod 67 is slidably moved in the bracket 68 in a direction longitudinally of the shaft unit 32 for a purpose which will now be described.

As illustrated in Fig. 6 the shift rod 67 is slidably supported within a tubular portion or cylinder 74 integrally formed with the bracket 68. Extended radially from the cylinder 74 and in communication with the inside of the cylinder 74 is a tubular member 76 having a ball bearing 77 at its lower end yieldably biased against the shift rod 67 by a spring 78 held in compression against the ball bearing 77 by a plug 79 threadably mounted in the outer end of the tube 76. The ball bearing 77 is selectively and yieldably held in three peripheral grooves 81, 82 and 83 formed in an axially spaced relation on the shifting rod 67.

The bearing 77 is shown in Fig. 6 as being within the peripheral groove 81 whereby to yieldably hold the shift rod 67 at one shifted position against longitudinal movement relative to the bracket 68. This shifted position of the rod 67 provides for the position of the clutch ring 61, as illustrated in Figs. 3 and 4, in an overlapping relation with the clutch members 54 and 59 and in mating engagement with such two clutch members. With the power from the truck engine being delivered to the drive shaft 36 power is thus transmitted from the shaft 36, and through the clutch members 54 and 62 to the clutch member 59 and in turn to the sleeve 58.

Integral with the sleeve 58 and oppositely arranged from the clutch member 59 is a double herringbone gear unit 84 which is in continuous meshing engagement with a corresponding double herringbone gear unit 86 integral with the countershaft 34, the gear units 84 and 86 being arranged adjacent to the casing side wall 24. The shaft 34 is rotatably supported in bearing assemblies 87 and 88 mounted in the casing side walls 24 and 26, respectively, with the bearing assembly 88 being provided with an oil retaining ring assembly 89. One end of the shaft 34 terminates in the bearing 87, while its other end extends through the bearing assembly 88 and outwardly from the casing 23 for operative connection with a shaft 91, which in turn is operatively connected in a driving relation with the grinding shaft 92 (Figs. 1 and 2). It is seen, therefore, that the location of the ball bearing 77 within the peripheral groove 81 of the shift rod 67 provides for the operation of the grinding mill 13 from the drive shaft 36.

On movement of the shift rod 67 to a position in which the ball bearing 77 is yieldably held within the peripheral groove 82 the clutch ring member 61 is moved to a position in mating engagement with the clutch member 54 and out of engagement with the clutch members 46 and 59. The clutch ring 61 is of a width less than the width of the clutch member 54 so that when it is out of engagement with the clutch members 46 and 59 the clutch ring rotates as a unit with the drive shaft 36. At this position of the clutch ring member 61 the gear 65 on the shaft 33, mentioned above, is adapted for meshing engagement with the gear 63 to provide for the operation of the bath mixing units 11 and 12 in a manner which will be described in detail later on.

When the shift rod 67 is moved to a position at which the ball bearing 77 is within the peripheral groove 83 the clutch ring member 61 is moved into an overlapping relation with the clutch members 54 and 46 to provide for a connection of the drive shaft 36 and the driven shaft 38, and in turn for a normal road operation of the truck.

By virtue of the ball bearing 77 being spring pressed into engagement with the peripheral grooves 81, 82, and 83, a selected position of the shifting rod 67 is accomplished by the feel of such engagement through the shift rod 67 and shift lever 71.

The gear 65, for engaging the gear 63 on the clutch ring member 61, is splined on the shaft 33 for movement axially of the shaft (Fig. 3). The shaft 33 is rotatably supported in the casing 23 in bearings 40a and 40, mounted in the casing end walls 24 and 26, respectively, with the bearing 40 being provided with an oil retainer assembly 45. One end of the shaft 33 terminates at the bearing 40a, while its other end extends through the casing end wall 26 for operative connection with a chain and sprocket assembly 50, which in turn is operatively connected with a gear mechanism 55 for driving the auger in the batch mixer 11 (Figs. 1 and 2). The mechanism 55 is connected through a shaft 60 with a gear mechanism 70 for driving the auger in the batch mixer 12. It is seen, therefore, that the augers in the batch mixers 11 and 12 are operatively connected with the shaft 33 for concurrent operation from the shaft 33.

Integrally formed with the gear 65 is a hub portion 96 having a peripheral groove 97 for slidably receiving a yoke 98 mounted adjacent one end of a shift rod 99, which is slidably supported in a bracket 101 carried on the inside of the casing side wall 27 (Figs. 5 and 7). The other end of the shift rod 99 is extended outwardly from the casing 23 in a direction forwardly of the truck in a parallel relation with the shifting rod 67 and is pivotally connected with a shift lever 102 in a manner similar in all respects to the connection of the shift rod 67 with the shift lever 71. The lever 102 is located forwardly of the operator's seat 69 and has its lower end pivoted on the frame member 72.

The bracket 101 is formed with a cylindrical portion 105 provided with a spring pressed ball assembly 103 which is similar in all respects to the cylindrical portion 74 and the spring pressed ball assembly 76—79, previously described in connection with the bracket 68 for the shifting rod 67. A further description of the cylinder 105 and spring pressed ball assembly 103 is, therefore, believed to be unnecessary.

The shift rod 99 within the cylinder 105 is formed with a pair of axially spaced peripheral grooves 104 and 106 adapted to selectively engage a ball bearing 107 in the assembly 103. With the ball bearing 107 within the annular groove 104 the gear 65 is in its position illustrated in Fig. 3 so as to be engageable with the gear 63 when the clutch ring member 61 is in an overlapping position on the clutch members 54 and 59. On movement of the rod 99 to position the annular groove 106 in engagement with the ball bearing 107, the gear 65 is axially moved on the shaft 33 to a position in the plane of the clutch member 54 so as to be in meshing engagement with the gear 63 when the annular groove 82 on the shift rod 67 is moved into an engaging position with the ball bearing 77.

In the operation of the power transmission device of this invention let it be assumed that a normal road operation of the truck is desired. The shift rod 67 is moved to locate the ball bearing 77 within the peripheral groove 83, and the shift rod 99 is moved to locate the ball bearing 107 within the peripheral groove 104. The gear 65 is thus out of meshing engagement with the gear 63 and power from the drive shaft 36 is transmitted only to the driven shaft 38 through the clutch member 54, clutch ring 61 and clutch member 46.

In order to operate only the grinding mill 13 the shift rod 67 is actuated to move the groove 81 into engagement with the ball bearing 77, and the shift rod 99 is actuated to locate the ball bearing 107 within the groove 106. The gear 65 is thus out of meshing engagement with the gear 63 and power is transmitted from the drive shaft 36 only to the counter-shaft 34 through the clutch member 54 and clutch ring 61 to the sleeve unit 58, and from the sleeve unit 58 through the gear unit 84 to the gear unit 86 on the shaft 34.

If it is desired to concurrently operate the grinding mill 13 and the batch mixers 11 and 12 the clutch ring member 61 is retained in its overlapping position on the clutch members 54 and 59 and the shift rod 99 is actuated to position the ball bearing 107 within the peripheral groove 104, to in turn provide for the axial movement of the gear 65 on the shaft 33 into an engaging position with the gear 63. Thus concurrently with the operation of the shaft 34, in the manner above described, power is transmitted from the clutch ring member 61 to the gear 65 and shaft 33.

When only the batch mixers 11 and 12 are to be operated the shift rod 67 is actuated to move the peripheral groove 82 into an engaging position with the ball bearing 77 to in turn provide for the location of the clutch ring member 61 only on the clutch member 54. With the clutch gear ring 61 thus located the shift rod 99 is actuated to move the peripheral groove 106 into an engaging position with the ball bearing 107 to in turn provide for the movement of the gear 65 into the plane of the clutch member 54 and into an engaging position with the gear 63 on the clutch ring 61. With the clutch member 62 on the ring 61 out of engagement with the clutch members 59 and 47, power from the shaft 36 is transmitted only to the shaft 33 through the clutch member 54, the clutch ring 61 and the gear 65.

It is apparent that the speed of rotation at which the driving shaft 36 is operated, when the truck is at a standstill, can be controlled to run at any of the speeds provided for by the transmission mechanism on the truck as regulated by the truck shifting lever 108.

From the above description it is seen that the invention provides a power transmission device which is of a simple and rugged construction, and readily operated by means conveniently located within the truck cab to provide for a normal road operation of the truck and, when the truck is at a standstill, for a selected or concurrent operation of a plurality of operating units carried on the truck.

Although the invention has been described with respect to a preferred embodiment thereof it is to be understood that it is not to be so limited since modifications and changes can be made

I claim:

1. A power transmission device for a motor vehicle to drive a plurality of operating units on said vehicle from the vehicle engine comprising a drive shaft operatively connected with the engine, a driven shaft in coaxial alignment with said drive shaft and operatively connected with the wheels of said vehicle, a bearing at the forward end of said driven shaft for rotatably supporting the rear end of said drive shaft, a first clutch member on said driven shaft, a second clutch member on said drive shaft, and a third clutch member rotatable on said drive shaft, said three clutch members having external splined portions and being arranged adjacent to each other with said second clutch member intermediate said first clutch member and said third clutch member, a fourth clutch member having an external gear portion, and an internal splined portion axially movable on said three clutch members to selected positions, with said internal splined portion having an axial width substantially equal to the axial width of said second clutch member, a countershaft operatively connected with one of said operating units, a gear axially movable on said counter-shaft into and out of meshing engagement with the external gear portion on said fourth clutch member, a second counter-shaft operatively connected with a second one of said operating units, means connecting said second counter-shaft for rotation with said third clutch member, and means for selectively moving said fourth clutch member and said gear to provide for only the operation of said vehicle wheels, a concurrent operation of said one and second operating units, or an individual operation of said one and second operating units.

2. A power transmission device to selectively drive a plurality of operating units comprising a drive shaft connected with a source of power, a driven shaft connected with one of said operating units and arranged in coaxial alignment with said drive shaft, a first clutch member on said driven shaft, a second clutch member on said drive shaft, a third clutch member rotatable on said drive shaft, said three clutch members having external splined portions and being positioned adjacent to each other with said second clutch member between said first clutch member and said third clutch member, a first counter-shaft connected with a second one of said operating units, means connecting said first counter-shaft for rotation with said third clutch member, a second counter-shaft connected to a third one of said operating units, a fourth clutch member having an internal splined portion and an external gear portion, said internal splined portion being axially movable on the external splined portions of said three clutch members and having an axial width substantially equal to the axial width of said second clutch member, a gear axially movable on said second counter-shaft into and out of meshing engagement with said external gear portion, and means for selectively moving said gear and fourth clutch member to provide for the separate operation of said three operating units and a concurrent operation of said second and third operating unit, with said power transmission device being in a neutral position when said fourth clutch member is on said second clutch member and disengaged from said gear.

3. A power transmission device for selectively driving a plurality of operating units comprising a drive shaft operatively connected at its front end with a source of power, a first clutch member at the rear end of said drive shaft, a driven shaft for one of said operating units in coaxial alignment with said drive shaft and having a socket portion at its front end for rotatably supporting the rear end of said drive shaft, an external splined portion on said socket portion adjacent said first clutch member, a second clutch member rotatably mounted on said drive shaft adjacent said first clutch member, a third clutch member having an external splined portion, and an internal splined portion axially movable on said driven shaft external splined portion and on said first clutch member and said second clutch member, a first gear rotatable on said drive shaft and connected with said second clutch member for rotation therewith, a countershaft for a second one of said operating units in continuous operative engagement with said first gear, a second countershaft for a third one of said operating units, a second gear mounted on said second countershaft for axial movement into and out of meshing engagement with the external gear portion on said third clutch member, with said third clutch member being axially movable to a first position in locking engagement with the external splined portion on said driven shaft and said first clutch member, to connect said driven shaft and drive shaft, and to a second position in locking engagement with said first clutch member and second clutch member to connect said drive shaft and said first countershaft, with said second gear being axially movable to operatively engage the external gear portion on the third clutch member when said third clutch member is in said second position.

4. A power transmission device for a motor vehicle to drive a plurality of operating units on said vehicle from the vehicle engine comprising a drive shaft driven by the vehicle engine, a driven shaft having a rear end operatively connected with the wheels of said vehicle, a hollow ring bearing portion at the front end of said driven shaft for rotatably supporting the rear end of said driving shaft, an external splined portion on said bearing portion, a first clutch member on said driving shaft adjacent said splined portion, a sleeve member rotatable on said driving shaft, a second clutch member and a first gear member on said sleeve member, with said second clutch member arranged adjacent said first clutch member, a counter-shaft connected with one of said operating units, a second gear member on said countershaft is meshed engagement with said first gear member, a third clutch member having an external gear portion and an internal splined portion movable axially on said external splined portion, and on said first clutch member and second clutch member to one operating position in locked engagement with said first clutch member and external splined portion, to connect said drive shaft with said driven shaft, and to a second operating position in locked engagement with said first clutch member and second clutch member, to connect said drive shaft with said countershaft, means for shifting said third clutch member to said two operating positions, a second countershaft connected with a second one of said operating units, a third gear member axially slidable on said second shaft, and means for selectively engaging said third gear member with the external gear portion on said third clutch member, when said third clutch member is in said second operating position, to connect said second shaft with said drive shaft.

DESIAX B. MARTIN.

REFERENCES CITED

The following references are of record in the file of this patent:

UNITED STATES PATENTS

| Number | Name | Date |
|---|---|---|
| 2,231,144 | Wagner | Feb. 11, 1941 |
| 2,190,259 | Custenborder | Feb. 13, 1940 |
| 2,106,087 | Davey | Jan. 18, 1938 |
| 2,084,887 | Bennett | June 22, 1937 |

FOREIGN PATENTS

| Number | Country | Date |
|---|---|---|
| 63,407 | Austria | Feb. 10, 1914 |